United States Patent
Ishizawa

(10) Patent No.: US 8,413,076 B2
(45) Date of Patent: Apr. 2, 2013

(54) INFORMATION PROCESSING APPARATUS AND METHOD

(75) Inventor: Masayuki Ishizawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 714 days.

(21) Appl. No.: 12/614,778

(22) Filed: Nov. 9, 2009

(65) Prior Publication Data

US 2010/0146462 A1    Jun. 10, 2010

(30) Foreign Application Priority Data

Dec. 8, 2008   (JP) .................................. 2008-312492

(51) Int. Cl.
*G06F 3/48* (2006.01)
(52) U.S. Cl. ........ 715/863; 345/156; 345/173; 345/442; 715/810; 715/769
(58) Field of Classification Search .................... 715/863
See application file for complete search history.

(56) References Cited

U.S. PATENT DOCUMENTS

| | | | |
|---|---|---|---|
| 6,639,584 B1* | 10/2003 | Li .................................. | 345/173 |
| 7,698,002 B2* | 4/2010 | Music et al. .................... | 700/17 |
| 8,250,034 B2* | 8/2012 | Manousos et al. ............. | 707/638 |
| 2003/0048291 A1* | 3/2003 | Dieberger ...................... | 345/732 |
| 2005/0079477 A1* | 4/2005 | Diesel et al. .................. | 434/350 |
| 2005/0212767 A1* | 9/2005 | Marvit et al. .................. | 345/158 |
| 2006/0055662 A1* | 3/2006 | Rimas-Ribikauskas et al. ............................. | 345/156 |
| 2007/0064004 A1* | 3/2007 | Bonner et al. ................. | 345/442 |
| 2007/0283296 A1* | 12/2007 | Nilsson ......................... | 715/863 |
| 2008/0062283 A1 | 3/2008 | Matsushita et al. ....... | 348/231.99 |
| 2008/0079718 A1* | 4/2008 | Woo .............................. | 345/419 |
| 2008/0180408 A1* | 7/2008 | Forstall et al. ................ | 345/177 |
| 2009/0091770 A1* | 4/2009 | Kano et al. .................... | 358/1.1 |
| 2010/0058251 A1* | 3/2010 | Rottler et al. ................. | 715/863 |
| 2010/0125792 A1* | 5/2010 | Fujiwara et al. .............. | 715/716 |
| 2010/0142833 A1* | 6/2010 | Ishizawa ........................ | 382/224 |
| 2010/0251116 A1* | 9/2010 | Rimas-Ribikauskas et al. ............................. | 715/702 |
| 2010/0306670 A1* | 12/2010 | Quinn et al. ................... | 715/753 |
| 2011/0072470 A1* | 3/2011 | Morris et al. .................. | 725/62 |
| 2011/0102332 A1* | 5/2011 | Birnbaum et al. ............ | 345/173 |
| 2011/0148918 A1* | 6/2011 | Ishizawa et al. ............. | 345/629 |
| 2011/0154225 A1* | 6/2011 | Martin .......................... | 715/760 |
| 2011/0157188 A1* | 6/2011 | Nakagawa et al. ........... | 345/473 |

(Continued)

FOREIGN PATENT DOCUMENTS

| JP | 10-228350 | 8/1998 |
|---|---|---|
| JP | 2006-295889 | 10/2006 |

OTHER PUBLICATIONS

Working screenshot of of printing to XPS file in Windows Vista manufactured by Microsoft, released on Jan. 30, 2007, 8 pages.*

*Primary Examiner* — William Bashore
*Assistant Examiner* — Reza Nabi
(74) *Attorney, Agent, or Firm* — Fitzpatrick, Cella, Harper & Scinto

(57) ABSTRACT

An information processing apparatus having a touch-sensitive panel and processing a gesture input performed via the touch-sensitive panel accepts an instruction from a user for transitioning from a first processing state to a second processing state; sets a number of gesture-input-based operations in accordance with the instruction accepted; and executes corresponding processing as a gesture input in the second processing state with regard to gesture inputs of the number of operations set. The information processing apparatus executes corresponding processing as a gesture input in the first processing state with regard to a gesture input after the gesture inputs of the number of operations have been performed.

10 Claims, 14 Drawing Sheets

U.S. PATENT DOCUMENTS

| | | | |
|---|---|---|---|
| 2011/0197147 A1* | 8/2011 | Fai | 715/753 |
| 2011/0248939 A1* | 10/2011 | Woo et al. | 345/173 |
| 2011/0254791 A1* | 10/2011 | Wong et al. | 345/173 |
| 2011/0283212 A1* | 11/2011 | Warner | 715/769 |
| 2012/0060117 A1* | 3/2012 | Bok et al. | 715/810 |
| 2012/0084688 A1* | 4/2012 | Robert et al. | 715/769 |
| 2012/0127089 A1* | 5/2012 | Waas | 345/173 |
| 2012/0127207 A1* | 5/2012 | Matas et al. | 345/676 |
| 2012/0327441 A1* | 12/2012 | Adachi et al. | 358/1.13 |

\* cited by examiner 501  502  503

GESTURE OF FLICKING IMAGE WITH FINGER

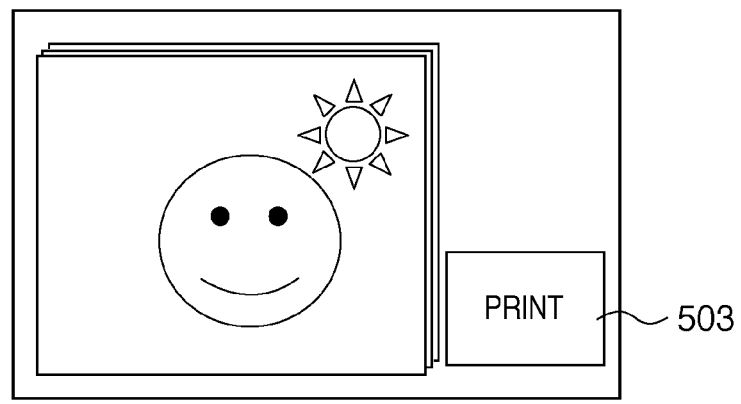
FIG. 6A
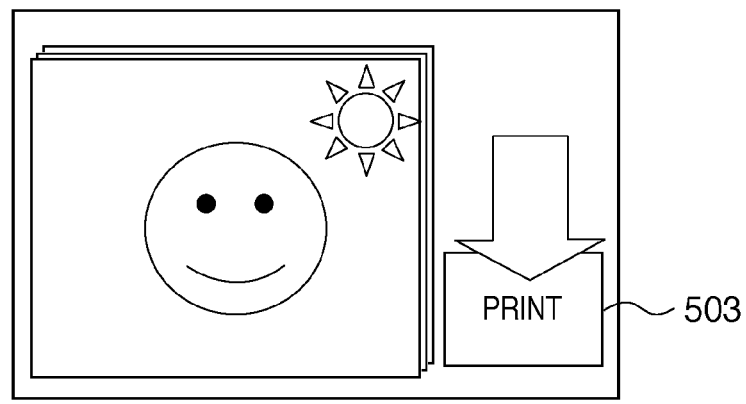
FIG. 6B
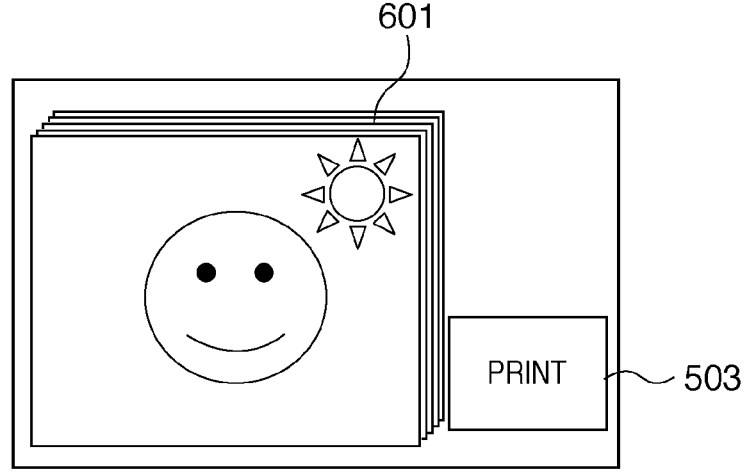
FIG. 6C

108

| REGISTRATION GESTURE \ TARGET | REPLICATED IMAGE | TARGET OTHER THAN REPLICATED IMAGE |
|---|---|---|
| GESTURE OF FLICKING IMAGE WITH FINGER | ALLOCATION PROCESSING | IMAGE ADVANCE PROCESSING |

| DIRECTION | IMAGE ID |
|---|---|
| LEFT | IMAGE A |
| RIGHT | NONE |
| UP | IMAGE A |
| DOWN | — |

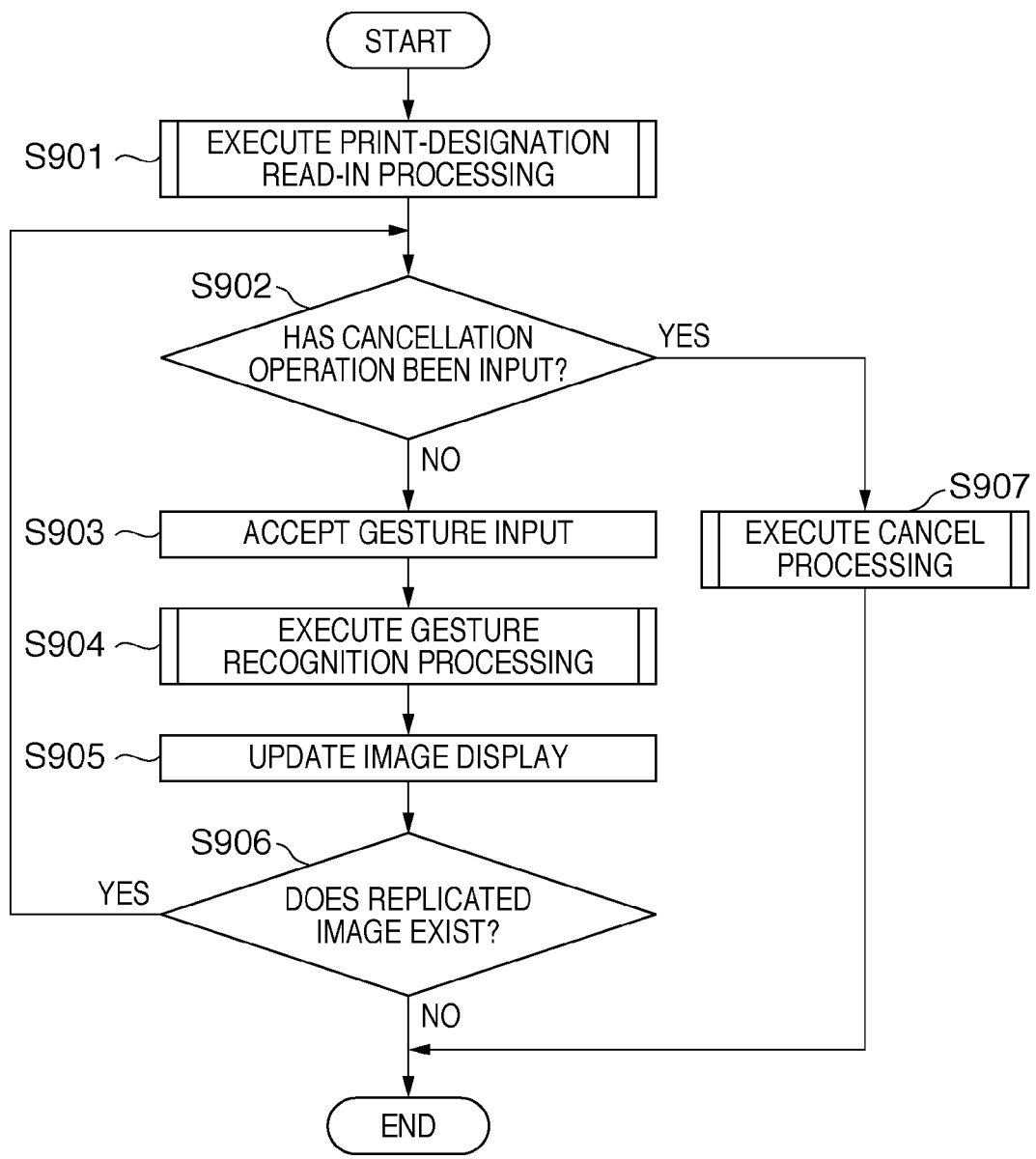

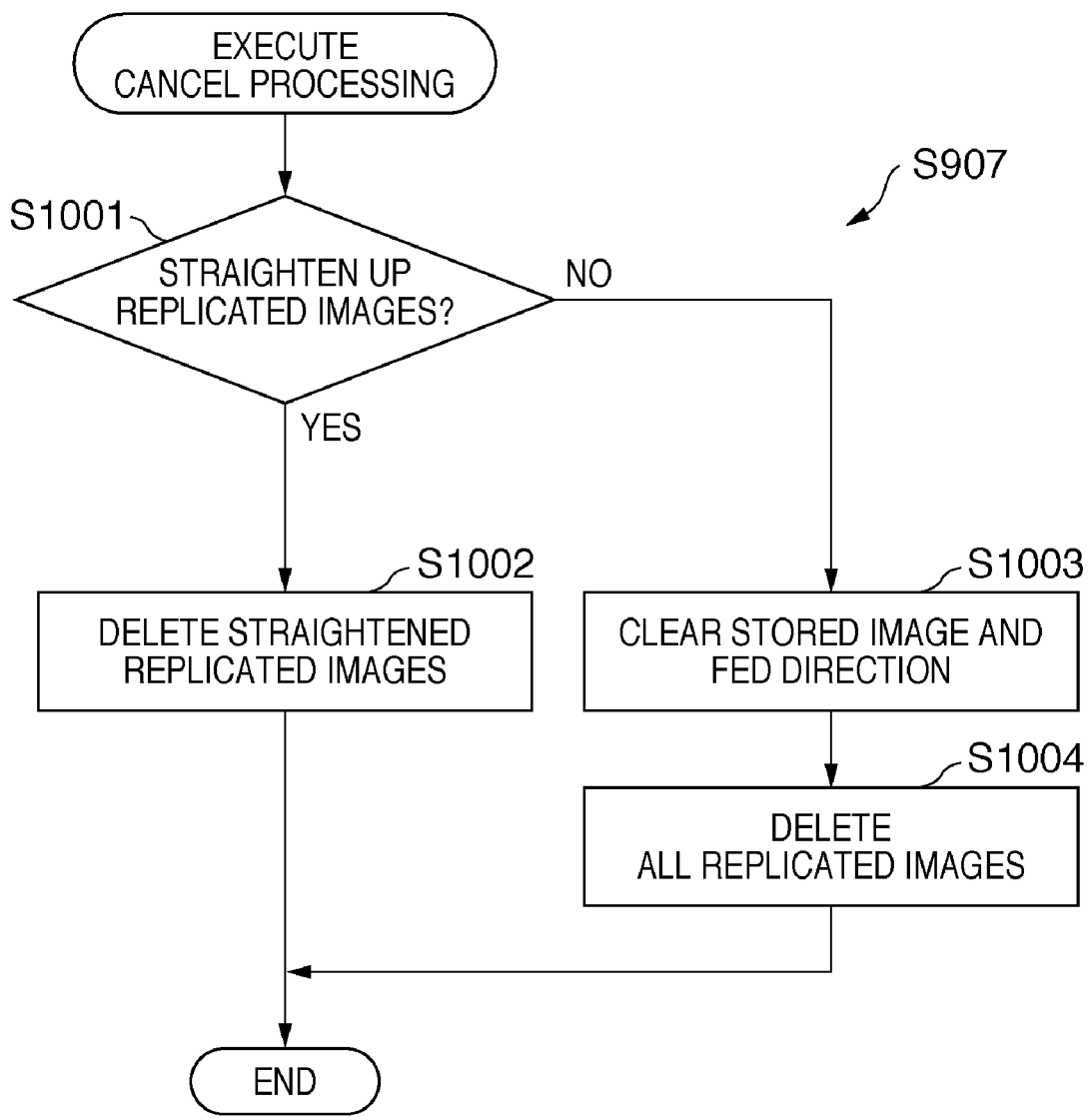

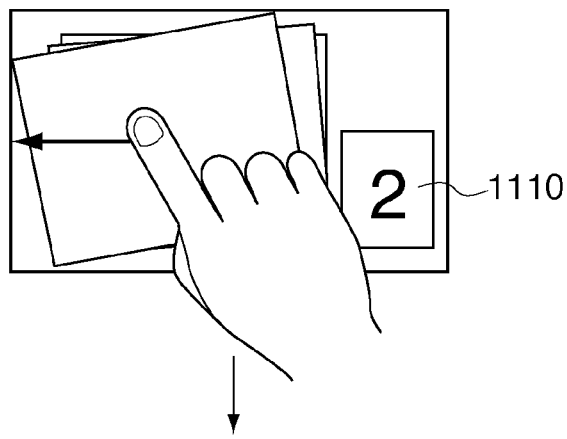
F I G. 11A
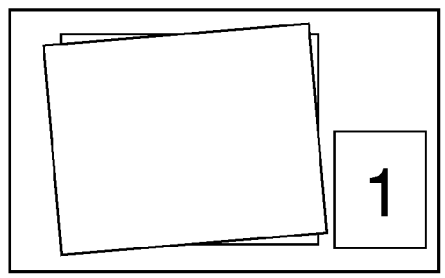
F I G. 11B
F I G. 11C
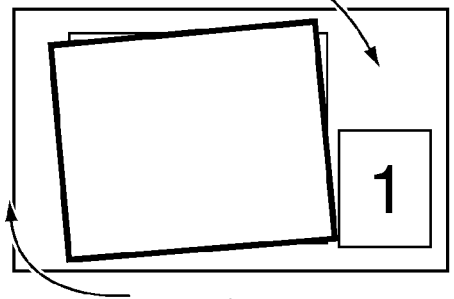
F I G. 11E
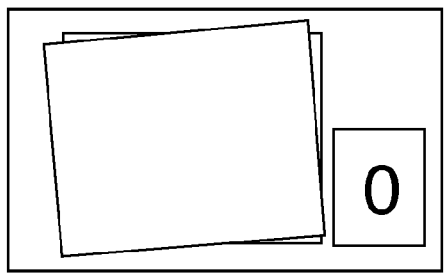
F I G. 11D
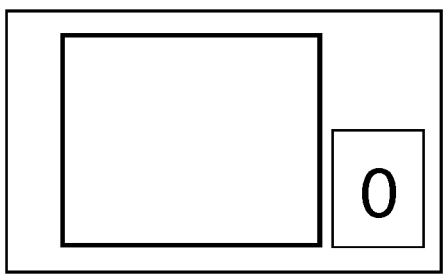
F I G. 11F
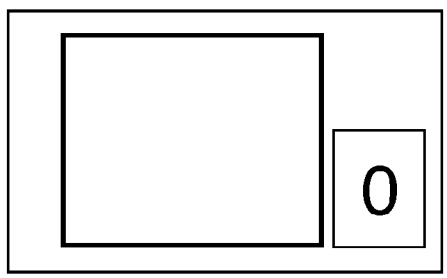

FIG. 13

| TYPE OF METADATA | DIRECTION |
|---|---|
| DATE | LEFT |
| PLACE | UP |
| PERSON PHOTOGRAPHED | RIGHT |

FIG. 14

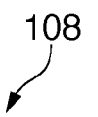

| REGISTRATION GESTURE \ TARGET | REPLICATED IMAGE | TARGET OTHER THAN REPLICATED IMAGE |
|---|---|---|
| GESTURE OF FLICKING IMAGE LEFTWARD WITH FINGER | APPEND DATE DATA | SAVE PROCESSING |
| GESTURE OF FLICKING IMAGE RIGHTWARD WITH FINGER | APPEND PLACE DATA | CANCEL PROCESSING |
| GESTURE OF FLICKING IMAGE UPWARD WITH FINGER | APPEND PERSON-PHOTOGRAPHED DATA | NONE |

INFORMATION PROCESSING APPARATUS AND METHOD

BACKGROUND OF THE INVENTION

1. Field of the Invention

The present invention relates to an information processing apparatus and method in which operation is possible by a gesture input.

2. Description of the Related Art

Many devices that have become available in recent years incorporate an input system that employs a touch-sensitive panel. Intuitive inputs such as gesture inputs can be made by using the touch-sensitive panel for this purpose. A gesture input is an input method of correlating a predetermined action with a specific device operation and executing the specific operation by inputting a gesture using a pen or finger.

With such a device using a touch-sensitive panel, inputs can be made efficiently by changing over the operation executed on the device side, in accordance with the processing desired by the user, in response to the same input, namely tracing by a pen or finger. For example, this means distinguishing whether a character is being input or whether a gesture is being input. Described below is an example in which processing is thus changed over in such a manner that different operations can be executed in response to the same input.

In Japanese Patent Laid-Open No. 10-228350 (referred to as "Patent Document 1" below), processing is changed over by a method of touching two or more points on a touch-sensitive panel simultaneously in order to switch between two types of input processing, namely character input processing and pointing processing. Further, in Japanese Patent Laid-Open No. 2006-295889 (referred to as "Patent Document 2" below), three types of processing, namely horizontal scrolling, vertical scrolling and page feed, are switched among by pressing a switch.

In accordance with Patent Document 1, it is possible to implement two different processing operations on the same touch-sensitive panel. However, it is required to perform a complicated changeover operation (touching two or more points on the touch-sensitive panel simultaneously) in order to change over between character input processing and pointing processing. Further, in Patent Document 2, it is required that the switch be pressed whenever a changeover is made among horizontal scrolling, vertical scrolling and page feed processing. It is required that the selecting operation be repeated in order to switch to the desired processing.

SUMMARY OF THE INVENTION

In accordance with the present invention, there are provided an information processing apparatus and method that make it possible to assign different processing operations to the same gesture input without performing a complicated operation.

According to one aspect of the present invention, there is provided an information processing apparatus, which has a touch-sensitive panel, for processing a gesture input performed via the touch-sensitive panel, the apparatus comprising: an acceptance unit configured to accept from a user, in a first processing state, an instruction to transition to a second processing state; a setting unit configured to set a number of gesture-input-based operations in accordance with the instruction accepted by the acceptance unit; and a processing unit configured to execute, after the instruction has been accepted by the acceptance unit, corresponding processing as a gesture input in the second processing state with regard to gesture inputs of the number of operations set by the setting unit, and to execute corresponding processing as a gesture input in the first processing state with regard to a gesture input after the gesture inputs of the number of operations have been performed.

Furthermore, according to another aspect of the present invention, there is provided an information processing method, which has a touch-sensitive panel, for processing a gesture input performed via the touch-sensitive panel, the method comprising: an acceptance step of accepting from a user, in a first processing state, an instruction to transition to a second processing state; a setting step of setting a number of gesture-input-based operations in accordance with the instruction accepted by the acceptance step; and a processing step of executing, after the instruction has been accepted at the acceptance step, corresponding processing as a gesture input in the second processing state with regard to gesture inputs of the number of operations set at the setting step, and executing corresponding processing as a gesture input in the first processing state with regard to a gesture input after the gesture inputs of the number of operations have been performed.

Further features of the present invention will become apparent from the following description of exemplary embodiments with reference to the attached drawings.

BRIEF DESCRIPTION OF THE DRAWINGS

FIGS. 6A to 6C are diagrams illustrating an example of a UI indication unit in the first embodiment;

FIG. 9 is a flowchart for describing processing in response to a gesture input according to a second embodiment of the present invention;

FIG. 10 is a flowchart for describing cancel processing in the second embodiment;

FIGS. 11A to 11F are diagrams useful in describing the flow of gesture input and processing in the second embodiment;

FIG. 13 is a diagram useful in describing the relationship between a gesture input and metadata appending processing in the third embodiment;

FIG. 14 is a diagram useful in describing registered gestures in the command database of the first embodiment;

DESCRIPTION OF THE EMBODIMENTS

Preferred embodiments of the present invention will now be described with reference to the accompanying drawings.

[First Embodiment]

An information processing apparatus 101 to which the present invention is applicable can be incorporated in a user interface (UI) indication unit of a printer, by way of example.

This embodiment will be described using an image as a target of processing and using a replicated image as a replication target.

Figure 5A:
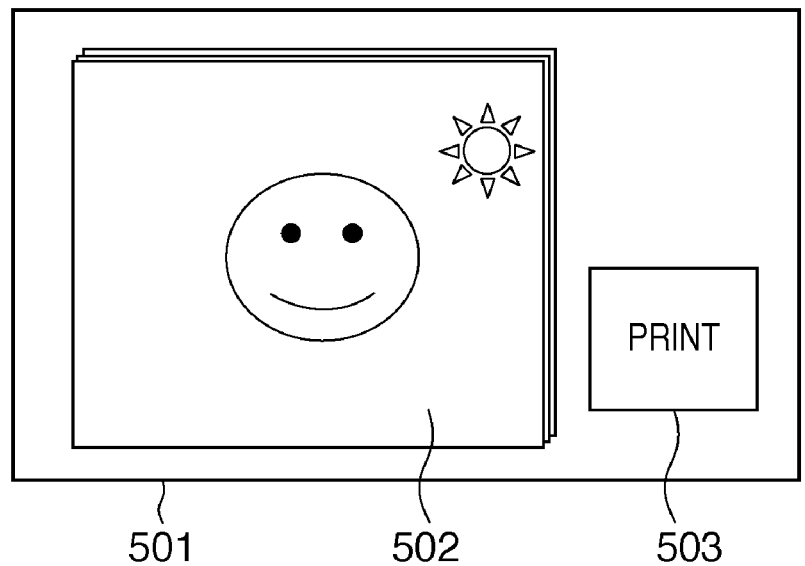
FIGS. 5A and 5B are diagrams illustrating an example of a UI indication unit in the first embodiment.

FIG. 5A is a diagram illustrating an example of a UI indication unit when the information processing apparatus 101 of this embodiment is applied. The UI indication unit is constituted by a touch-sensitive panel 501 and is capable of performing a gesture input using a finger or pen with respect to an image in an image display area 502. Further, by pressing a print designation button 503 to input a print instruction, the printing of the image being displayed topmost at the time of the instruction input can be designated. It should be noted that the print designation button 503 is one example; as long as it is possible to designate printing, it does not matter what method is used to accomplish this and the pressing of such a button does not constitute a limitation. Such a UI indication unit is applicable to a printer, by way of example.

Figure 2:
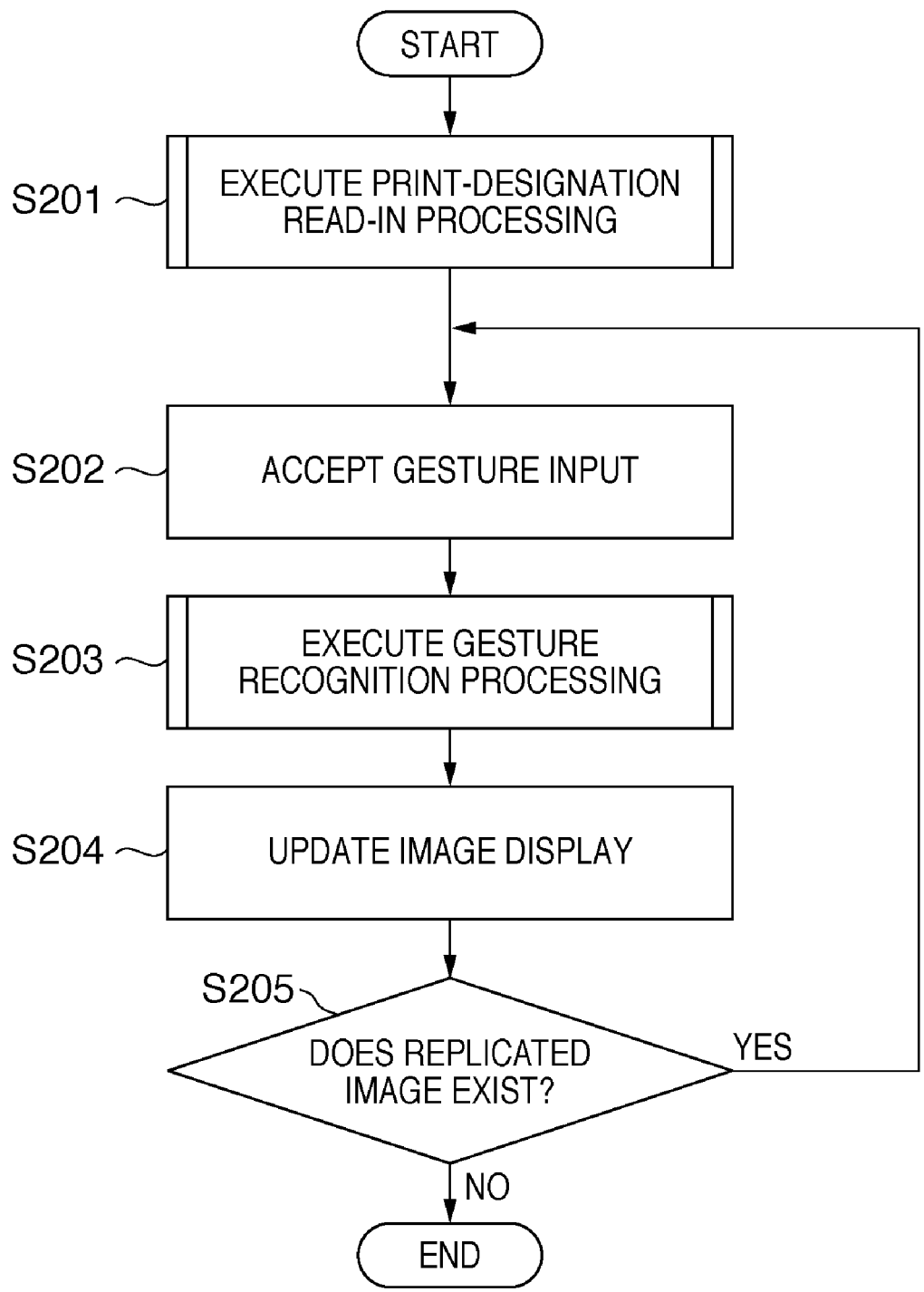
FIG. 2 is a flowchart useful in describing processing in response to a gesture input according to a first embodiment.
Figure 3:
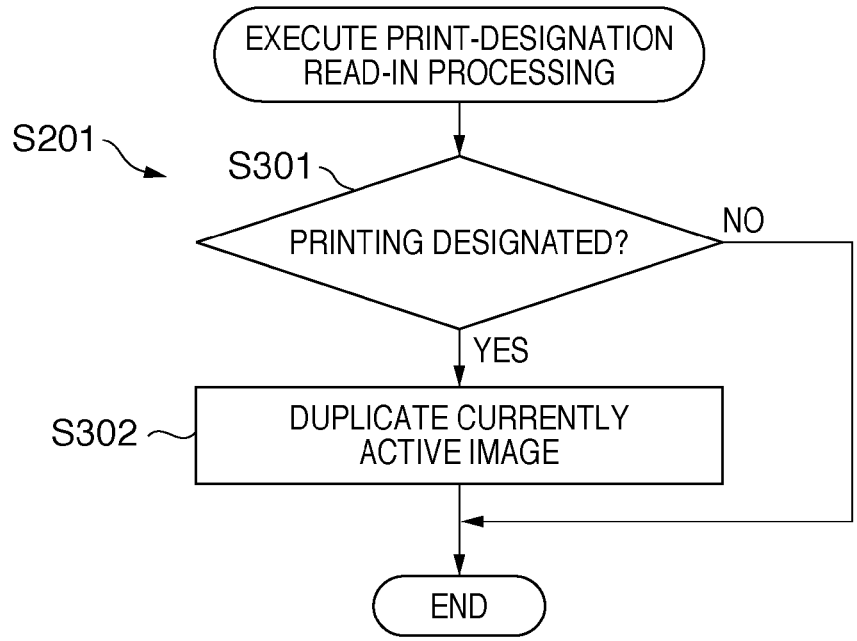
FIG. 3 is a flowchart relating to processing for reading in a designation of number of print pages in the first embodiment.
Figure 4:
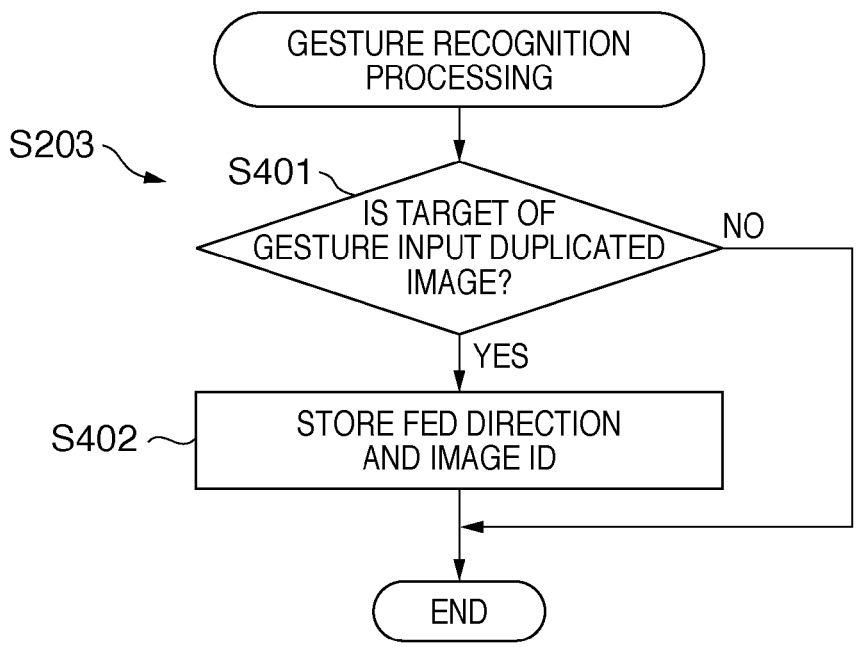
FIG. 4 is a flowchart relating to gesture recognition processing according to the first embodiment.

Next, the operation of the information processing apparatus 101 will be described with reference to the functional configuration of FIG. 1 and the flowchart of FIG. 2. Further, FIG. 3 is a flowchart illustrating the details of processing (print-designation read-in processing) at step S201 in FIG. 2. FIG. 4 is a flowchart illustrating the details of processing (gesture recognition processing) at step S203 in FIG. 2.

Figure 5B:
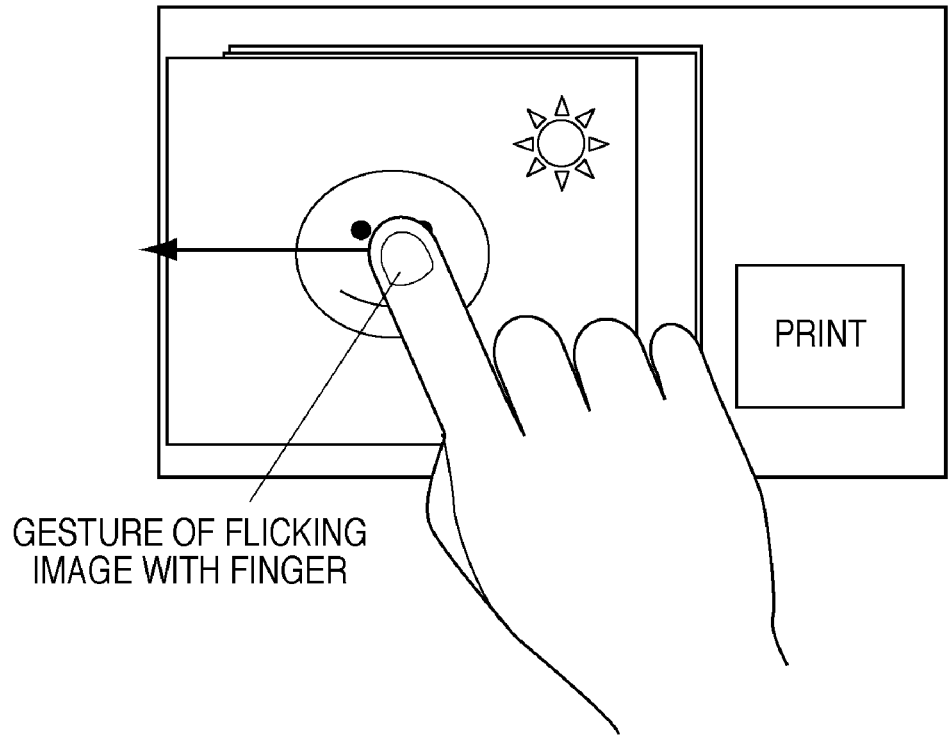
Figures 8A, 8B:
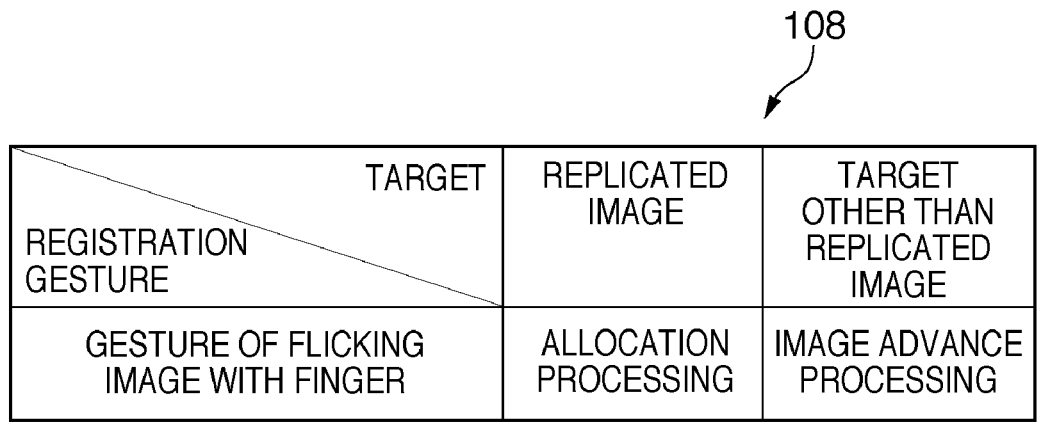
FIG. 8A is a diagram illustrating a registered gesture in a command database of the first embodiment.
FIG. 8B is a diagram illustrating an example of result of allocating images by a gesture input in this embodiment.

In the first embodiment, an example will be described in which two types of processing, namely image advance processing and print allocation processing, are changed over and handled in response to a single gesture input, namely a gesture of flicking an image with a fingertip as illustrated in FIG. 5B. Image advance processing is processing for changing over displayed images in order to view the images. Allocation processing apportions and groups images according to the direction in which the image was flicked by a gesture input, in order to subsequently print collectively a grouped plurality of images. These processing operations (allocation processing and image advance processing) have been registered in a command database 108 in correspondence with a gesture input (a finger-flicking gesture), as illustrated in FIG. 8A.

An instruction input unit 103 accepts an instruction input for executing print designation processing, and an instruction acceptance unit 105 holds the instruction input from the instruction input unit 103. In this embodiment, an instruction input for designating printing is accepted by the instruction acceptance unit 105 in response to operation of the print designation button 503. In print-designation read-in processing at step S201, whether the print designation by pressing the print designation button 503 has been instructed or not is read in and processing conforming to whether the print designation has been input or not is executed.

The print-designation read-in processing at step S201 will be described in detail with reference to FIG. 3. At step S301, a replication unit 107 checks the print designation information being held by the instruction acceptance unit 105. If a print designation exists in the instruction acceptance unit 105, processing proceeds from step S301 to step S302. If there is no print designation, on the other hand, no further processing is executed in FIG. 3, the print-designation read-in processing is terminated and control proceeds to step S202.

At step S302, the replication unit 107 generates a replicated image of the image (the object to be manipulated) that was being displayed topmost in the image display area 502 of a display/touch-sensitive panel 102 when printing was designated. In response to an instruction from the replication unit 107, a display control unit 110 executes processing for displaying the generated replicated image in place of the image that was being displayed. The generation of replicated images referred to here means displaying the print-designated image in the image display area in such a manner that there appears to be an increase in the number of these images without an actual increase in the number thereof. The number of replicated images is the same as a number of operations that conforms to the processing (designation of printing in this example) instructed by the instruction input. According to this embodiment, images can be apportioned in a maximum of three directions in the print designation and therefore three replicated images are generated whenever printing is designated. It should be noted that the setting of number of operations is not limited to that of the above embodiment. For example, in a second embodiment described later, it may be so arranged that the number of operations can be designated by the user through input of a numerical value.

FIG. 6A illustrates the UI indication unit in the state that prevails prior to designation of printing. A case will be considered in which the print designation button 503 is pressed (FIG. 6B) starting from the state of FIG. 6A. When the print designation button 503 is pressed, the image being displayed at the top is replaced by three replicated images 601, as described above (see FIG. 6C).

At step S201, as mentioned above, processing undergoes a transition from a first processing state in which "image advance processing" is executed to a second processing state in which "image allocation processing" is executed in response to acceptance of an instruction entered by pressing the print designation button 503. At step S302, as described above, the replicated image of the object that was being displayed at the top at the time of the transition is generated in a number equivalent to the number of images to be dealt with in image allocation processing. Although the details will be described at step S202 onward, the number of these replicated images is equivalent to a number of operations set in relation to image allocation processing, which is the second processing state. With regard to the gesture inputs of the number of operations, the corresponding processing is executed as a gesture input in the image allocation processing. When unprocessed replicated images no longer exist, or that is, with regard to a gesture input made after the gesture inputs of the number of operations have been made, the corresponding processing is executed as a gesture input in image advance processing, which is the first processing state.

Next, at step S202, a gesture acceptance unit 104 becomes capable of accepting a gesture input that is entered via the display/touch-sensitive panel 102 and waits until the gesture input arrives. Processing proceeds to step S203 if a gesture is input. It is assumed that the gesture input is performed in similar fashion with regard to replicated images as well. That is, a gesture input is accepted regardless of whether the object being displayed topmost on the display/touch-sensitive panel 102 is or is not a replication.

At step S203, a command switch unit 106 recognizes the gesture input accepted at step S202 and executes processing conforming to this gesture. In this embodiment, as illustrated in FIG. 8A, if the target of a gesture is a replicated image, allocation processing of an image to be printed is executed. If the target of a gesture is an image other than a replicated image, then image advance processing is executed. The gesture recognition processing at step S203 will be described with reference to the flowchart of FIG. 4.

At step S401, the command switch unit 106 determines whether the target for which the gesture input has been performed is a replicated image. That is, the command switch unit 106 determines whether the image that was being displayed topmost on the display/touch-sensitive panel 102 at the moment the gesture input was made is a replicated image. Whether the gesture input is that associated with the first processing state (image advance processing) or that associated with the second processing state (image allocation processing) is decided based upon this determination and the corresponding processing is then executed. Processing proceeds to step S402 if a "YES" decision is rendered at step S401 and to step S204 if a "NO" decision is rendered. At step S204, image advance processing is executed to thereby display the next image on the screen of the display/touch-sensitive panel 102. Therefore, if processing proceeds from step S401 to step S204, ordinary image advance is performed. Further, although whether the target of the gesture input is a replicated image is determined at step S401, it may be so arranged that the number of operations is decremented in accordance with the gesture input and processing corresponding to the gesture input is changed over upon determining whether the number of operations has reached zero or not.

At step S402, the command switch unit 106 executes processing corresponding to the gesture. For example, in a case where the entered gesture is a gesture of flicking an image with a finger, the command switch unit 106 queries the command database 108 based upon the condition that the gesture is a "gesture of flicking an image with a finger" and the target of the gesture is a "replicated image", and executes the processing that has been registered in this database. In this embodiment, a gesture has been registered as shown in FIG. 8A and "allocation processing" is executed.

In allocation processing, the following two processing steps are executed:
1. Acquire the image ID (the ID of the object of interest) possessed by the replicated image.
2. Acquire the direction in which the replicated image was sent by this gesture and store the direction in correlation with the image ID.

Figure 7A:
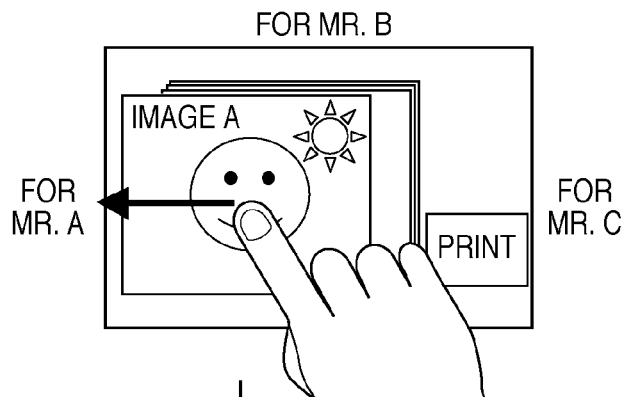
FIGS. 7A to 7D are diagrams illustrating examples of gesture inputs with respect to replicated images in the first embodiment.
Figure 7B:
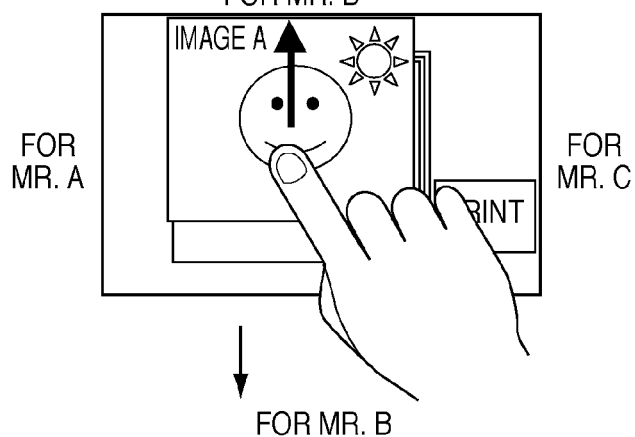

FIGS. 7A to 7D illustrate an example in which a gesture of flicking an image with a finger is input for three replicated images of an image A that have been generated. FIG. 7A is a diagram in which a gesture of flicking an image with a finger is being input for a first replicated image among three replicated images being displayed topmost. In this case, the target is a replicated image of image A and the gesture is a gesture of flicking the image to the left. Accordingly, the command switch unit 106 stores information to the effect that image A has been sent to the left in an operation-result storage unit 109. Similarly, in case of FIG. 7B, the target is a replicated image of image A and the gesture is a gesture of flicking the image upward. Accordingly, information to the effect that image A has been sent upward is stored in the operation-result storage unit 109. The correlation between image ID and direction is held in the operation-result storage unit 109 in the manner illustrated in FIG. 8B. Directions and users may be assigned beforehand and an image to be printed may be allocated on a per-user basis, as by deciding that an image is one for Mr. A if the image was sent to the left and one for Mr. B if the image was sent upward.

Figure 7C:
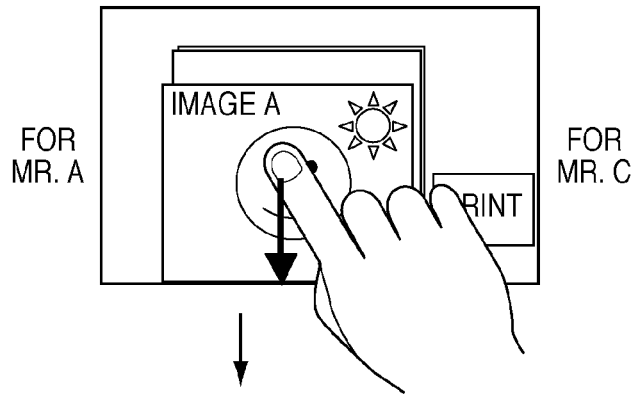

In this embodiment, the number of replicated images created when a print designation is made is always equivalent to the number of directions in which allocation is possible. Consequently, the number of prints is adjusted by flicking a superfluous replicated image in a direction in which allocation is not possible, as illustrated in FIG. 7C. Information indicative of allocation is not stored in this case. That is, in accordance with a prescribed gesture input with respect to a replicated image (in this example, in accordance with a direction in which allocation is not supported), this replicated image is discarded and just the number of operations is decremented. By adopting this expedient, the replicated images of image A vanish at the conclusion of the processing of FIG. 7C that is for the purpose of allocating the set number of images. As a result, allocation processing for the printing of image A ends.

Figure 7D:
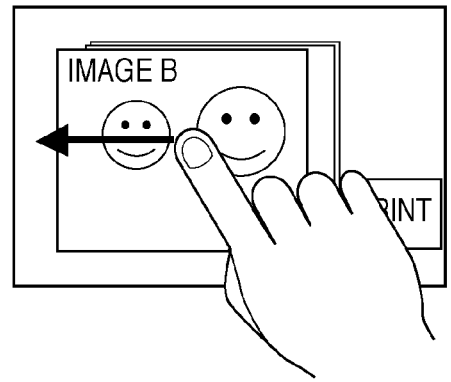

In the case of FIG. 7D, image B is not a replicated image. Accordingly, the command switch unit 106 queries the command database 108 based upon the condition that the entered gesture is a gesture of flicking an image with a finger and the target of the gesture is not a replicated image. As illustrated in FIG. 8A, processing for image advance is merely carried out in the case of this condition.

Next, at step S204, the display control unit 110 executes processing for updating the display of the image in the image display area 502 in response to an instruction from the command switch unit 106. In a case where a gesture of flicking an image with a finger has been entered with respect to each image of all images inclusive of replicated images, the display control unit 110 updates the display in the image display area so as to display the next image. That is, replicated images are erased from the screen by the finger-flicking gestures.

At step S205, the command switch unit 106 determines whether a replicated image exists (whether a replicated image is being displayed on the screen). Control proceeds to step S202 if a YES decision is rendered and processing is terminated if a "NO" decision is rendered. Processing from step S202 to S204 is repeated until a "NO" decision is rendered at step S205.

When the above-described processing ends, information of the kind shown in FIG. 8B is held in the operation-result storage unit 109. Accordingly, if a user is allocated to each "direction", print processing is executed on a per-direction basis, whereby printing can be performed on a per-user basis in combinations of different numbers of copies and different images.

In accordance with the foregoing embodiment, replicated images of an object are generated in a number equal to the number of operations in accordance with acceptance of an instruction resulting from the print designation button 503, the replicated images are displayed on the display screen one after another and gesture inputs are accepted one at a time with regard to each replicated image. However, the form in which replicated images are displayed is not limited to that mentioned above and it may be so arranged that a plurality of replicated images are displayed on the display screen simultaneously, by way of example. For instance, by displaying four replicated images on the display screen simultaneously and performing the above-described "finger-flicking gesture" with respect to each of the replicated images, image allocation processing can be executed. Of course, the first processing state and the second processing state are not limited to the examples of the above-described embodiment (namely image advance processing and image allocation processing).

Thus, in accordance with this embodiment, the effect obtained is that when a gesture input to a device is made, a plurality of different processing operations can be assigned, without performing a complicated changeover operation, with respect to the same gesture input.

[Second Embodiment]

Described above in the first embodiment is an example in which a replicated image is generated by designating printing and the processing corresponding to a gesture input is changed over depending upon a change in the target of the gesture. Described below in a second embodiment is an example in which designation of printing is performed by input of a numerical value and the designation of number of prints is revised.

The second embodiment also will be described using an image as a target of processing and using a replicated image as a replication target.

FIG. 9 is a flowchart representing the overall flow of the second embodiment. Further, FIG. 10 is a flowchart representing the details of cancel processing (step S907) according to the second embodiment.

In the second embodiment, the gesture used is the flicking of an image with a finger in a manner similar to that of the first embodiment. It is assumed that the gesture has been registered in the command database 108 as shown in FIG. 8A. As illustrated in FIG. 11A, the number of prints of an image being displayed topmost at the time of input can be designated by inputting a numerical value in a print-number designating area 1110 by operating a numeric keypad or by a handwriting input method well known in the prior art. That is, an input of number of prints from the instruction input unit 103 to the print-number designating area 1110 serves also as a print-designation input. Further, it does not matter what method is used to input the number of prints so long as a numerical value can be input.

At the processing of step S901 for reading in a print designation, the replication unit 107 reads in the number of prints that have been input to the print-number designating area 1110 and executes processing conforming to the input result. It is assumed here that the instruction acceptance unit 105 holds the number of prints that have been input by the instruction input unit 103. It should be noted that a limit may be placed on the numerical value capable of being designated in the print-number designating area 1110. For example, if the apparatus is capable of allocating up to a maximum of three prints, then a limit of three or less would be provided as the designatable numerical value.

The processing (processing for reading in the print designation) at step S901 of the second embodiment will be described further with reference to the flowchart of FIG. 3. At step S301, the replication unit 107 reads in the print-number information that has been input to the print-number designating area 1110 and is being held in the instruction acceptance unit 105. If a numerical value for designating the number of prints exists in the instruction acceptance unit 105, processing proceeds to step S302. If the numerical value does not exist, then processing for reading in the print designation is terminated without any processing being executed. Processing proceeds to step S902.

At step S302, the replication unit 107 generates a number of replicated images equivalent to the numerical value that has been input to the print-number designating area 1110, unlike operation according to the first embodiment.

Next, at step S902, the command switch unit 106 determines whether the user has performed a gesture input indicating cancellation of the designation of number of prints. Processing proceeds to step S907 if there is such a cancellation input and to step S903 if there is not.

At step S903, processing for accepting a gesture input suited to this embodiment is executed in a manner similar to that at step S202 of the first embodiment. At step S904, the command switch unit 106 executes gesture recognition processing suited to this embodiment in a manner similar to that at step S203 of the first embodiment. At step S905, the command switch unit 106 performs updating of the image display suited to this embodiment in a manner similar to that at step S204 of the first embodiment. The processing of steps S902 to S907 is repeated as long as replicated images exist. Processing is terminated if replicated images no longer exist (step S906). That is, the processing of steps S903 to S906 is similar to the first embodiment (steps S202 to S205) and the details of these steps need not be described again.

If a gesture input corresponding to cancellation has been recognized, on the other hand, then the command switch unit 106 executes print cancel processing at step S907. It is assumed that there are two methods of cancel processing in the second embodiment, namely a method of straightening up replicated images that are skewed and a method of applying a revision to the print-number designating area 1110.

FIGS. 11A to 11F are diagrams useful in describing cancel processing according to the second embodiment. A case where the two types of cancel processing are applied to a replicated image in the state shown in FIG. 11B will be described.

When a replicated image is generated in the second embodiment, the way the replicated image looks is changed to make it look different from a normal image. In this embodiment, a plurality of replicated images are stacked and displayed in skewed form. That is, as illustrated in FIG. 11A, images other than replicated images are displayed in neat alignment and replicated images are displayed skewed. It should be noted that the way each image looks may be made as desired as long as the way a normal image looks and the way a replicated image looks are different.

FIG. 11B is the result of executing the three steps below in line with the processing of FIG. 9 starting from the state shown in FIG. 11A.

1. Accept the numerical value "2" as the number of prints.
2. Execute processing for generating two replicated images.
3. Execute allocation processing based upon a gesture of finger-flicking the first replicated image in the leftward direction.

In FIG. 11B, therefore, the apparatus comes to possess the following two items of information:

Information 1: a replicated image for allocation to printing is a single remaining replicated image; and
Information 2: allocation of one replicated image in the leftward direction has been completed.

When an input for shifting replicated images in the direction of the arrows is performed to thereby neatly stack the replicated images, as shown in FIG. 11C, the command switch unit 106 determines at step S902 that an operation corresponding to cancellation has been input and executes the cancel processing of step S907. Alternatively, also in a case where the numerical value in the print-number designating area 1110 has been changed, the command switch unit 106 determines that an operation corresponding to cancellation has been input and executes the processing of step S907. The cancel processing at step S907 will now be described in detail with reference to the flowchart of FIG. 10.

If it is determined at step S1001 that the input is indicative of processing for neatly stacking the replicated images, control proceeds to step S1002 and the neatly stacked replicated images are deleted. The input used to neatly stack the replicated images may be a dragging operation using a finger or pen or a gesture input for which a separate gesture has been prepared. Further, as long as it is possible to neatly stack the replicated images, any input for accomplishing this may be adopted. In a case where replicated images no longer exist as a result of deleting a replicated image, only Information 1 of the above-mentioned Information 1 and 2 is cancelled and a state shown in FIG. 11D, in which there is no designation to print, is restored. Further, if two or more replicated images remain, then all that is done is the deletion of one replicated image. In other words, the allocation processing already executed is validated and processing for deleting only the neatly stacked replicated images is executed.

On the other hand, consider a case where rather than straightening the replicated images and canceling processing, as described above, a canceling operation is entered in the print-number designating area 1110, as illustrated in FIG. 11E. In this embodiment, it is assumed that "0" has been input from the instruction input unit 103 such as a numeric keypad. In this case also, it is determined at step S902 that an operation corresponding to cancellation has been input, whereupon the flow of cancel processing of step S907 begins.

At step S1001, it is determined that processing is not processing for neatly stacking the replicated images. Processing then proceeds to step S1003. Here the command switch unit 106 deletes the image ID and the sent-direction information that have been stored in the operation-result storage unit 109. At step S1004, the command switch unit 106 deletes all of the replicated images being displayed. That is, the items Information 1 and Information 2 are both cancelled and the state in which a print designation has not been made is restored, as illustrated in FIG. 11F. The cancellation operation applied to the print-number designating area 1110 is not limited to an input from a numeric keypad. The operation may be performed by a gesture input or by a handwriting input.

It should be noted that the arrangement in which, in accordance with a prescribed instruction input, the second processing state (image allocation processing) is quit and the first processing state (image advance processing) is restored before gesture inputs of the number of operations is accepted is not limited to the arrangement for performing the above-mentioned cancellation operation. For example, it may be so arranged that the result of allocation thus far is maintained and the remaining replicated images are erased (the remaining number of operations is made zero). Further, it may be so arranged that the remaining number of operations is designated to be a numerical value other than zero as the numerical-value input from the instruction input unit 103. In this case, the result of allocation thus far is maintained and the number of operations is changed to the numerical value from the instruction input unit 103. If this arrangement is adopted, it becomes possible to increase or decrease the number of operations.

In accordance with the second embodiment, as described above, it is so arranged that two methods of canceling a designation of number of prints are implemented. As a result, when a designation of remaining number of prints is cancelled, replicated images can be deleted and a print designation cancelled by an intuitive method.

[Third Embodiment]

In the first and second embodiments, an instruction input for executing a print designation is described as an instruction input for executing specific processing. However, the present invention is not limited to such processing. For example, as specific processing, the invention is applicable to processing for appending metadata to an image captured by a digital camera. In a third embodiment, an example of application of the present invention to such processing for appending metadata will be described.

This embodiment also will be described using an image as a target of processing and using a replicated image as a replication target. Further, according to this embodiment, the information processing apparatus 101 constitutes part of a digital camera and the UI indication unit forms the UI of the digital camera.

This embodiment will be described with reference to FIGS. 12A to 12D and FIG. 13.

Figure 12A:
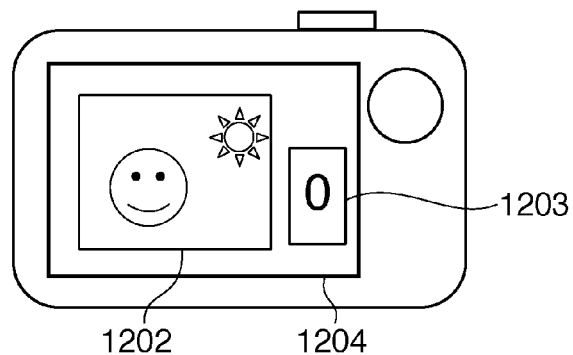
FIGS. 12A to 12D are diagrams useful in describing the flow of gesture input and processing in a third embodiment of the present invention.

As illustrated in FIG. 13, information composed of correlated directions and metadata desired to be appended is stored beforehand in the command database 108. In the third embodiment, it is assumed that the metadata that can be appended is a maximum of three types (date, place and person photographed). Reference will be had to FIG. 12A to describe an example in which a number of items of metadata that have been designated in a numerical-value input area 1203 are appended to an image 1202.

Figure 1:
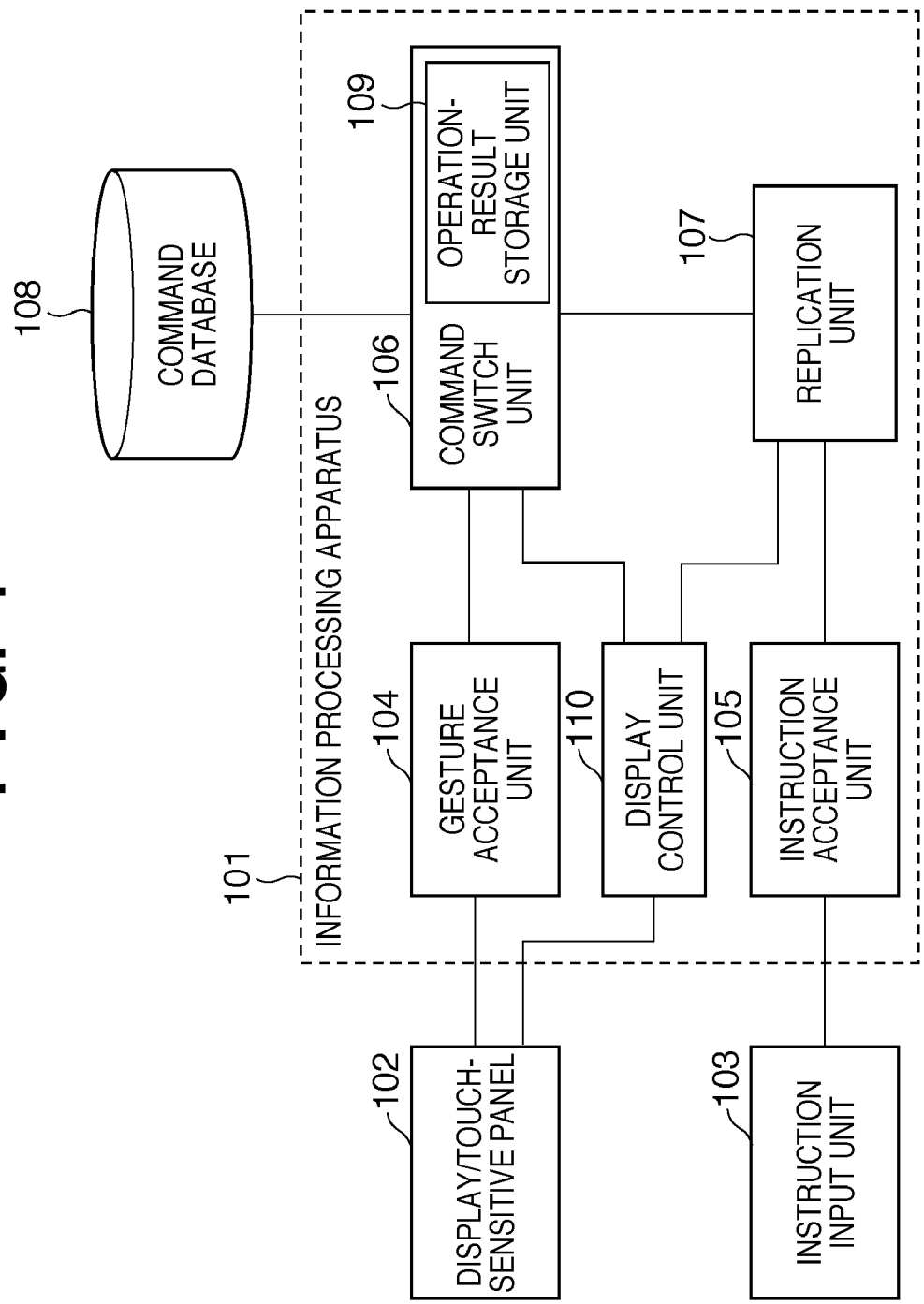
FIG. 1 is a block diagram illustrating an example of the functional configuration of an information processing apparatus which provides a UI indication unit according to an embodiment of the present invention.

The UI indication unit of the digital camera according to the third embodiment applies the information processing apparatus shown in FIG. 1 and has a touch-sensitive panel 1204 constituted by the display/touch-sensitive panel 102. The touch-sensitive panel 1204 is provided with the numerical-value input area 1203 for inputting a numerical value. It is assumed that numerals can be written with a finger and that the written numerical value can be input by using a well-known handwriting input for the numerical-value input area 1203. It is assumed that the UI is a UI capable of selection processing for saving or erasing a captured image presented on the UI indication unit after the image is captured. Naturally, as in the second embodiment, a limit may be placed on the numerical value capable of being designated in the numerical-value input area 1203.

The gesture used in this embodiment is assumed to be only the gesture of flicking an image with a finger, and the relationship between gesture and target that has been registered in the command database 108 is as shown in FIG. 14.

Figure 12B:
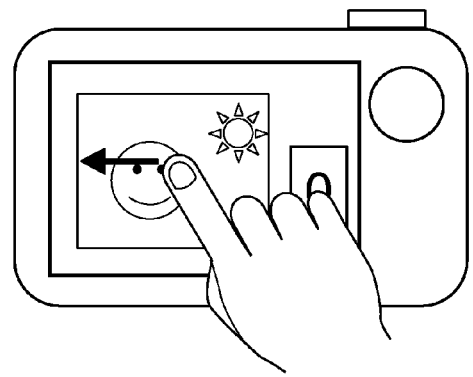

It is assumed that a gesture of flicking to the left an image that is not a replicated image has been input following the capture of the image, as illustrated in FIG. 12B. In this case, processing for saving the image is executed by querying the command database 108 having the information shown in FIG. 14. Conversely, if an image that is not a replicated image is flicked to the right, then the image is not saved but is erased. It is assumed that the shooting mode is restored after the left or right flicking gesture is made. In this embodiment, a first processing state which prevails prior to the input of a numerical value in the numerical-value input area 1203 is a state in which image selection processing is executed. A second processing state to which a transition is made in response to an input of a numerical value is a state in which processing for appending metadata to an image is executed.

Even if a gesture of flicking upward an image that is not a replicated image is input, nothing occurs because corresponding processing has not be set for such a gesture.

Figure 12C:
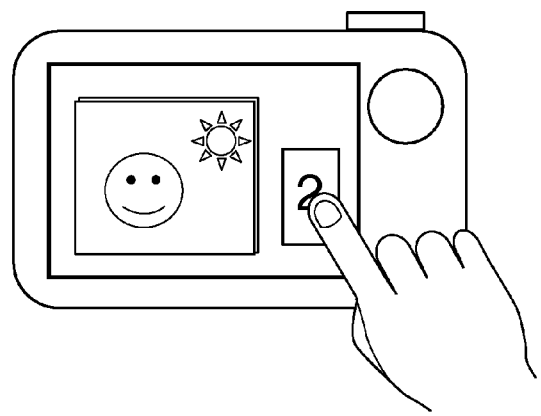

Now assume that "2" has been input in the numerical-value input area 1203 after the capture of an image, as illustrated in FIG. 12C. As described in the second embodiment, processing for generating two replicated images and substituting these for the image being displayed is executed. The numeral that is input here represents the number of items of metadata to be appended to an image. A case will be described in which two items of metadata, namely date data and place data from among the three types of metadata (FIG. 13) handled in this embodiment, are appended to an image.

Figure 12D:
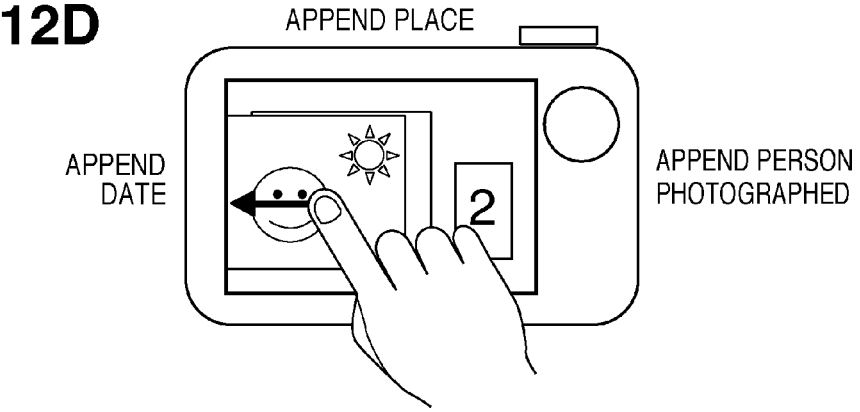

If the date is to be appended, a replicated image is flicked to the left, as illustrated in FIG. 12D. The command switch unit 106 queries the command database 108 with regard to the processing which should be executed, based upon the condition that the target of the leftward flicking gesture is a replicated image. As illustrated in FIG. 14, the processing corresponding to this condition is processing for appending date data to the image, and the command switch unit 106 acquires the time from the system and appends this time to the image as metadata.

Similarly, if place information is to be appended, the replicated image is flicked upward. In this case, the command switch unit 106 queries the command database 108 with regard to the processing which should be executed, based upon the condition that the target of the upward flicking gesture is a replicated image. As illustrated in FIG. 14, the processing corresponding to this condition is processing for appending place data to the image. Therefore, information concerning the photography location that has been registered in the system beforehand by the user is appended, by way of example. It should be noted that this apparatus may be provided with a GPS function and that the location information may be acquired from this function and appended as the metadata.

When appending a number of items of metadata equivalent to the numerical value that has been input to the numerical-value input area 1203 ends upon being performed as described above, the image to which the items of date data and place data have been appended is saved. The shooting mode is then restored. It is obvious that the above-described processing can be implemented by adopting the processing illustrated in the flowcharts of FIGS. 2 to 4. In this case, the processing at step S402 becomes the processing for appending metadata described above. Further, at step S204, if step S402 has been traversed, the image that was the original of the replicated images (namely the image to which some type of metadata has been appended) is saved and the replicated images are erased. On the other hand, if step S204 has been executed directly from step S401, then the gesture input is a gesture input directed to something other than a replicated image and, hence, the above-described image selection processing is executed.

In accordance with the third embodiment, as described above, appending of metadata is possible through a simple operation.

[Fourth Embodiment]

In the first to third embodiments described above, processing for manipulating images in first and second processing states has been described as an example. However, the present invention is not limited to such processing. In a fourth embodiment, an example will be described in which the invention is applied to shooting using a self-timer that starts shooting in response to face recognition by a digital camera.

This embodiment will be described with reference to FIGS. 15A to 15D. The information processing apparatus 101 shown in FIG. 1 is applied to the UI indication unit of the digital camera according to the fourth embodiment. The UI indication unit has a touch-sensitive panel 1404 constituted by the display/touch-sensitive panel 102. The touch-sensitive panel 1404 is provided with a shooting-number designating area 1403 for inputting a numerical value that designates number of people to be photographed in order for shooting to start.

An image 1402 for planning a shot is displayed on the touch-sensitive panel 1404 and, by pressing a shutter-release button 1405, the image is captured and saved. It is assumed that a value representing number of people can be input in the shooting-number designating area 1403 by writing in a numeral by a finger or pen using the well-known handwriting input method. It is assumed that if the shot-planning image 1402 is pointed at using a fingertip or pen, then this point will be brought into focus.

Figure 16:
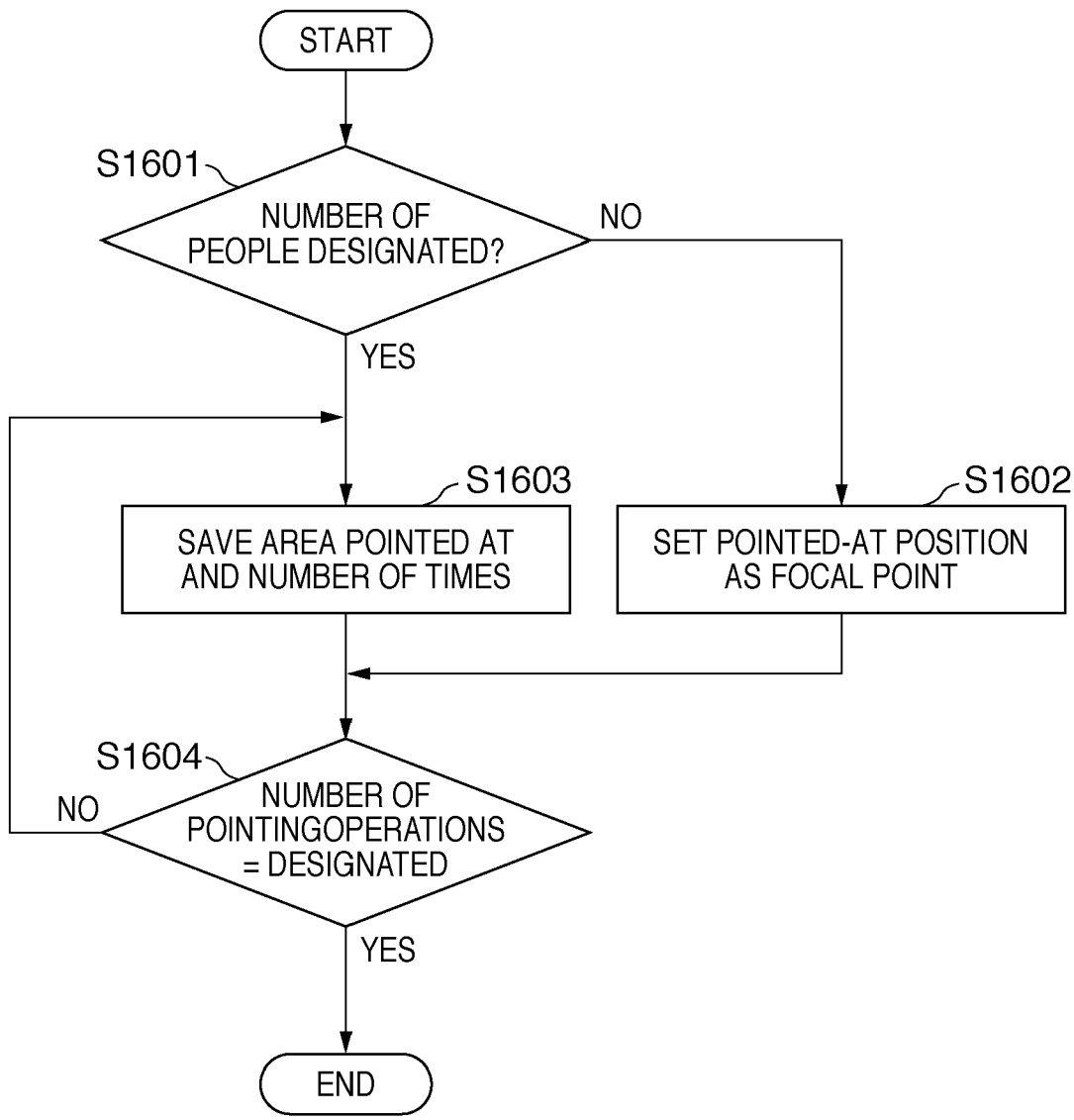
FIG. 16 is a flowchart for describing processing according to a fourth embodiment of the present invention.

Described next will be an example in which an image in which four people constitute the subject is captured using a self-timer that utilizes image recognition processing. FIG. 16 is a flowchart for describing processing according to the fourth embodiment.

Figure 15A:
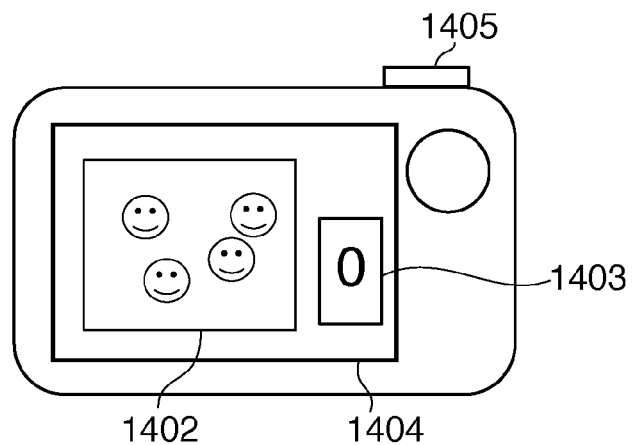
FIGS. 15A to 15D are diagrams useful in describing the flow of gesture input and processing in a fourth embodiment of the present invention.

In a case where number of persons to be in a shot is not designated, as shown in FIG. 15A, the picture is shot at the moment image recognition processing determines that the faces of four people are included in the display area of the shot-planning image 1402. In this case, if the shot-planning image 1402 is pointed at, then an image in which this point has been brought into focus can be shot ("NO" at step S1601 in FIG. 16;→step S1602).

Figure 15B:
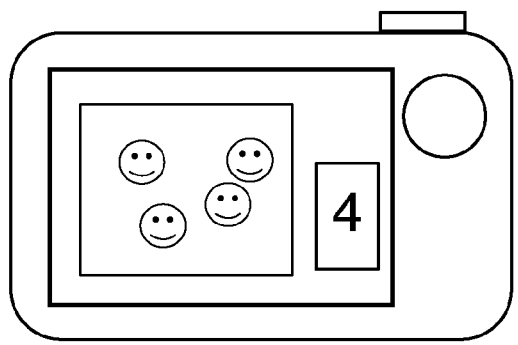

On the other hand, in a case where a numerical value has been input in the shooting-number designating area 1403, as shown in FIG. 15B, the camera operates in a manner different from that described above. Specifically, in the case where there is a designation of the numerical value, the operating screen is split into a plurality of areas and, in addition, an area in which the pointing operation was performed and the number of pointing operations are registered in correlation with each other. It is possible for the number of pointing operations to be made up to a designated numerical value ("YES" at step S1601; step S1603, step S1604). As a result of this operation, shooting is executed at the moment faces the number of which is equivalent to the number of pointing operations are recognized in each area.

Figure 15C:
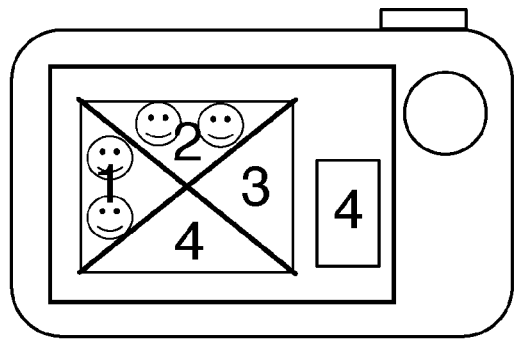
Figure 15D:
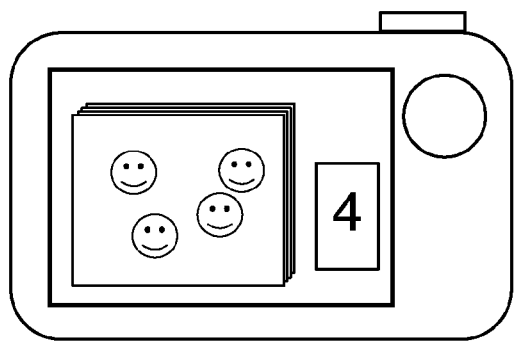

More specifically, in accordance with input of a numerical value in the shooting-number designating area 1403, the display area of the shot-planning image 1402 is split into four portions, as shown in FIG. 15C, and the meaning of the display area of the shot-planning image 1402 changes to that of a person-layout designating area. For instance, in a case where "4" has been input to the shooting-number designating area 1403, four pointing operations are accepted as layout designating operations. For example, assume that among the four areas into which the screen has been divided, two pointing operations have been performed in area 1 and two in area 2. In this case, shooting is executed at the moment it is determined by image recognition processing that four faces are included in the image display area of the shot-planning image 1402 and, moreover, two faces are included in area 1 and two in area 2.

It should be noted that in the fourth embodiment, the image display area is divided into four portions by diagonal lines. However, how the image display area is divided and the number of divisions are not limited to the above example. Further, in order to represent the number of times remaining that pointing can be performed, the shot-planning image may be replicated and displayed, at the moment "4" is input, in a number equivalent to the number of people in the shot, and a display may be presented in which the replicated images are turned over one at a time whenever pointing is performed.

In accordance with the fourth embodiment, as described above, two types of processing, namely processing for designating a position to be focused on and processing for deciding layout, can be assigned to a pointing gesture. Further, in accordance with the fourth embodiment, shooting that takes a layout of persons into account automatically is possible.

[Fifth Embodiment]

The first to fourth embodiments have been described solely with regard to a case where a gesture input directed toward a target or replicated target involves what is topmost. However, the target of the input is not limited to what is topmost. For example, in FIG. 11A, in a case where a gesture of flicking the second image (the image that is second from the topmost image) of two replicated images with a finger has been input, this may be construed as inputting a gesture of finger-flicking all images on top of the image for which the gesture was input. This means that the same image ID is correlated with two identical directions. Further, this is equivalent to reducing the remaining number of operations by two in response to a single operation.

In accordance with each of the foregoing embodiments, as described above, a plurality of different processing operations can be assigned to the same gesture input without performing a troublesome operation.

[Other Embodiments]

Though modes of practicing the present invention have been described above in detail, it is possible for the present invention to be worked as a system, apparatus, method, program or storage medium, etc., by way of example. Specifically, the present invention may be applied to a system constituted by a plurality of devices or to an apparatus comprising a single device.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-312492, filed Dec. 8, 2008, which is hereby incorporated by reference herein in its entirety.

What is claimed is:

1. An information processing apparatus that has a touch-sensitive panel for processing a gesture input performed via the touch-sensitive panel, the information processing apparatus comprising:
an acceptance unit configured to accept an instruction from a user for transitioning from a first processing state to a second processing state;
a setting unit configured to set a number of operations in accordance with the instruction accepted by the acceptance unit;
a replication unit configured to generate replicated images of an object in a number equivalent to the number of operations set by the setting unit and to replace an original image of the object with the replicated images; and
a processing unit configured to execute, after transitioning from the first processing state to the second processing state, processing on the replicated images in accordance with a gesture input, and to execute, if the replicated images no longer exist, processing of the first processing state in accordance with the gesture input,
wherein the first processing state is a state in which image advance processing for changing over displayed images in order to view images by gesture input is executed, and
wherein the second processing state is a state in which processing for allocating images, in order to subsequently print grouped images collectively, by gesture input is executed.

2. The information processing apparatus according to claim 1, wherein
the acceptance unit accepts a numerical value as the instruction; and
the setting unit sets the numerical value that is received by the acceptance unit to the number of operations.

3. The information processing apparatus according to claim 2, wherein the processing unit displays the numerical value accepted by the acceptance unit and decrements the numerical value when a gesture is input.

4. The information processing apparatus according to claim 1, further comprising a canceling unit configured to delete at least one of the replicated images, without applying processing to the object, in accordance with a prescribed gesture input with respect to the replicated images.

5. The information processing apparatus according to claim 4, wherein
the processing unit displays the replicated images on a display screen while shifting the replicated images such that the replicated images are displayed in a different manner than a normal image; and
the prescribed gesture input in the canceling unit aligns one of the replicated images with an image other than the normal image.

6. The information processing apparatus according to claim 1, further comprising a quitting unit configured to quit the second processing state, even if any of the replicated images exist, in accordance with a prescribed instruction input.

7. The information processing apparatus according to claim 1, wherein the processing unit displays the replicated images on the display screen while shifting the replicated images, and, in a case where a gesture input has been performed with respect to one of the replicated images shifted and displayed, applies processing corresponding to the gesture input to the one of the replicated images and to all of replicated images being displayed in superimposed form on top of the one replicated image.

8. An information processing method that has a touch-sensitive panel for processing a gesture input performed via the touch-sensitive panel, the information processing method comprising steps of:
accepting an instruction from a user for transitioning from a first processing state to a second processing state;
setting a number of operations in accordance with the instruction accepted by the accepting step;
generating replicated images of an object in a number equivalent to the number of operations set in the setting step and replacing an original image of the object with the replicated images; and
executing, after transitioning from the first processing state to the second processing state, processing on the replicated images in accordance with a gesture input, and executing, if the replicated images no longer exist, processing of the first processing state in accordance with the gesture input,
wherein the first processing state is a state in which image advance processing for changing over displayed images in order to view images by gesture input is executed, and wherein the second processing state is a state in which processing for allocating images, in order to subsequently print grouped images collectively, by gesture input is executed.

9. A non-transitory computer-readable storage medium storing a computer program that when executed causes a computer to perform an information processing method comprising steps of:
accepting an instruction from a user for transitioning from a first processing state to a second processing state;
setting a number of operations in accordance with the instruction accepted by the accepting step;
generating replicated images of an object in a number equivalent to the number of operations set in the setting step and replacing an original image of the object with the replicated images; and
executing, after transitioning from the first processing state to the second processing state, processing on the replicated images in accordance with a gesture input, and executing, if the replicated images no longer exist, processing of the first processing state in accordance with the gesture input,
wherein the first processing state is a state in which image advance processing for changing over displayed images in order to view images by gesture input is executed, and
wherein the second processing state is a state in which processing for allocating images, in order to subsequently print grouped images collectively, by gesture input is executed.

10. An information processing apparatus that has a touch-sensitive panel for processing a gesture input performed via the touch-sensitive panel, the information processing apparatus comprising:
an acceptance unit configured to accept an instruction from a user for transitioning from a first processing state to a second processing state;
a setting unit configured to set a number of operations in accordance with the instruction accepted by the acceptance unit;
a replication unit configured to generate replicated images of an object in a number equivalent to the number of operations set by the setting unit and to replace an original image of the object with the replicated images; and
a processing unit configured to execute, after transitioning from the first processing state to the second processing state, processing on the replicated images in accordance with a gesture input, and to execute, if the replicated images no longer exist, processing of the first processing state in accordance with the gesture input,
wherein the processing unit displays the replicated images on a display screen while shifting the replicated images such that the replicated images are displayed in a different manner than a normal image, and
wherein a prescribed gesture input in a canceling unit aligns one of the replicated images with an image other than the normal image.

* * * * *